(12) United States Patent
Thodiyil

(10) Patent No.: US 11,849,129 B2
(45) Date of Patent: Dec. 19, 2023

(54) INTRA-BLOCK COPY DECODING USING DYNAMIC RE-MAPPING OF ON-CHIP MEMORY

(71) Applicant: QUALCOMM Incorporated, San Diego, CA (US)

(72) Inventor: John Thodiyil, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/655,393

(22) Filed: Mar. 18, 2022

(65) Prior Publication Data

US 2023/0300357 A1    Sep. 21, 2023

(51) Int. Cl.
*H04N 19/423*   (2014.01)
*H04N 19/159*   (2014.01)
*H04N 19/176*   (2014.01)
*H04N 19/593*   (2014.01)

(52) U.S. Cl.
CPC ......... *H04N 19/423* (2014.11); *H04N 19/159* (2014.11); *H04N 19/176* (2014.11); *H04N 19/593* (2014.11)

(58) Field of Classification Search
CPC .......................... H04N 19/423; H04N 19/159
See application file for complete search history.

(56) References Cited

U.S. PATENT DOCUMENTS

| | | | | |
|---|---|---|---|---|
| 6,594,751 | B1 * | 7/2003 | Leivent | G06F 12/123 |
| | | | | 711/209 |
| 10,178,403 | B2 * | 1/2019 | Seregin | H04N 19/573 |
| 10,812,822 | B2 * | 10/2020 | Rapaka | H04N 19/523 |
| 10,986,349 | B2 * | 4/2021 | Zhou | H04N 19/139 |
| 10,999,594 | B2 * | 5/2021 | Hsieh | H04N 19/563 |
| 11,109,036 | B2 * | 8/2021 | Li | H04N 19/172 |

(Continued)

FOREIGN PATENT DOCUMENTS

WO    2021057751 A1    4/2021

OTHER PUBLICATIONS

Series H: Audiovisual and Multimedia Systems Infrastructure of audiovisual services—Coding of moving video, ITU-T Telecommunication Standardization Sector of ITU, H.266, Aug. 2020, pp. 1-516.

(Continued)

*Primary Examiner* — Irfan Habib
(74) *Attorney, Agent, or Firm* — QUALCOMM Incorporated; Espartaco Diaz Hidalgo

(57) ABSTRACT

A device includes a decoder configured to identify, during an intra-block copy (IBC) decoding process on at least a portion of a coding unit of video data, a target virtual address for data access associated with a particular operation of the IBC decoding process. The target virtual address is generated according to an addressing scheme of a virtual memory used by the IBC decoding process. The decoder is configured to dynamically map the target virtual address to a particular memory address of a portion of an on-chip memory. The on-chip memory is configured to store reconstructed blocks of the video data and has a second size that is smaller than a first size of the virtual memory. The decoder is also configured to access the on-chip memory using the particular memory address to perform the particular operation of the IBC decoding process.

20 Claims, 10 Drawing Sheets

(56) References Cited

U.S. PATENT DOCUMENTS

| | | | | |
|---|---|---|---|---|
| 11,172,207 | B2* | 11/2021 | Li | H04N 19/159 |
| 11,202,079 | B2* | 12/2021 | Xu | H04N 19/176 |
| 11,228,775 | B2* | 1/2022 | Xu | H04N 19/176 |
| 11,284,066 | B2* | 3/2022 | Xu | H04N 19/573 |
| 11,284,103 | B2* | 3/2022 | Zhu | H04N 19/105 |
| 11,317,099 | B2* | 4/2022 | Xu | H04N 19/107 |
| 11,317,113 | B2* | 4/2022 | Li | H04N 19/52 |
| 11,375,217 | B2* | 6/2022 | Xu | H04N 19/80 |
| 2005/0105623 | A1 | 5/2005 | Linzer | |
| 2016/0330474 | A1* | 11/2016 | Liu | H04N 19/503 |
| 2017/0091118 | A1* | 3/2017 | Mari | G06F 12/0815 |
| 2020/0336735 | A1 | 10/2020 | Chang et al. | |
| 2021/0201434 | A1* | 7/2021 | Wang | G06F 9/3885 |

OTHER PUBLICATIONS

International Search Report and Written Opinion—PCT/US2023/064516—ISA/EPO—dated May 15, 2023.

* cited by examiner

INTRA-BLOCK COPY DECODING USING DYNAMIC RE-MAPPING OF ON-CHIP MEMORY

I. FIELD

The present disclosure is generally related to decoding video data.

II. DESCRIPTION OF RELATED ART

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC) and extensions of such standards. Such video devices may transmit, receive, encode, decode, and/or store digital video information more efficiently by implementing such video coding techniques.

Video coding techniques include spatial (intra-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded slice of a picture are encoded using spatial prediction with respect to reference samples in neighboring blocks in the same picture. In general, in an intra-block copy (IBC) coding mode, a video encoder may determine predictive blocks for a current block, where the predictive blocks are in the same frame (picture) as the current block. The predictive blocks may be identified by a motion vector (also called a block vector).

During decoding, previously decoded pixels that are identified via one or more motion vectors are used to generate predicted pixels for a current block. For example, a VVC IBC implementation specifies accessing a relatively large number of previously decoded pixels (e.g., 256×128 pixels, or 61 kilobytes (Kbytes)), that were decoded prior to the current coding unit being decoded, to be available for fetch after reconstruction. This access requirement can be satisfied by having the previously decoded pixel data locally available on-chip, such as buffered in a static random access memory (SRAM), or stored off-chip in a dynamic random access memory (DRAM) using cached-direct memory access (DMA). Such on-chip and off-chip solutions are expensive in terms of area, and implementation of an on-chip 61 Kbyte SRAM may be prohibitively expensive. However, off-chip storage using cached-DMA also incurs higher power consumption and increased access latency, and therefore reduced performance, as compared to on-chip storage.

III. SUMMARY

According to a particular implementation of the techniques disclosed herein, a device includes a decoder configured to identify, during an intra-block copy (IBC) decoding process on at least a portion of a coding unit of video data, a target virtual address for data access associated with a particular operation of the IBC decoding process. The target virtual address is generated according to an addressing scheme of a virtual memory used by the IBC decoding process. The decoder is configured to dynamically map the target virtual address to a particular memory address of a portion of an on-chip memory. The on-chip memory is configured to store reconstructed blocks of the video data and has a second size that is smaller than a first size of the virtual memory. The decoder is also configured to access the on-chip memory using the particular memory address to perform the particular operation of the IBC decoding process.

According to a particular implementation of the techniques disclosed herein, a method of decoding video data includes identifying, at one or more processors during an intra-block copy (IBC) decoding process on at least a portion of a coding unit of the video data, a target virtual address for data access associated with a particular operation of the IBC decoding process, the target virtual address generated according to an addressing scheme of a virtual memory used by the IBC decoding process. The method includes dynamically mapping, at the one or more processors, the target virtual address to a particular memory address of a portion of on-chip memory, the on-chip memory having a second size that is smaller than a first size of the virtual memory. The method also includes accessing the on-chip memory using the particular memory address to perform the particular operation of the IBC decoding process.

According to a particular implementation of the techniques disclosed herein, a non-transitory computer-readable medium includes instructions that, when executed by one or more processors, cause the one or more processors to identify, during an intra-block copy (IBC) decoding process on at least a portion of a coding unit of video data, a target virtual address for data access associated with a particular operation of the IBC decoding process, the target virtual address generated according to an addressing scheme of a virtual memory used by the IBC decoding process. The instructions, when executed by one or more processors, cause the one or more processors to dynamically map the target virtual address to a particular memory address of a portion of on-chip memory, the on-chip memory having a second size that is smaller than a first size of the virtual memory. The instructions, when executed by one or more processors, also cause the one or more processors to access the on-chip memory using the particular memory address to perform the particular operation of the IBC decoding process.

Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
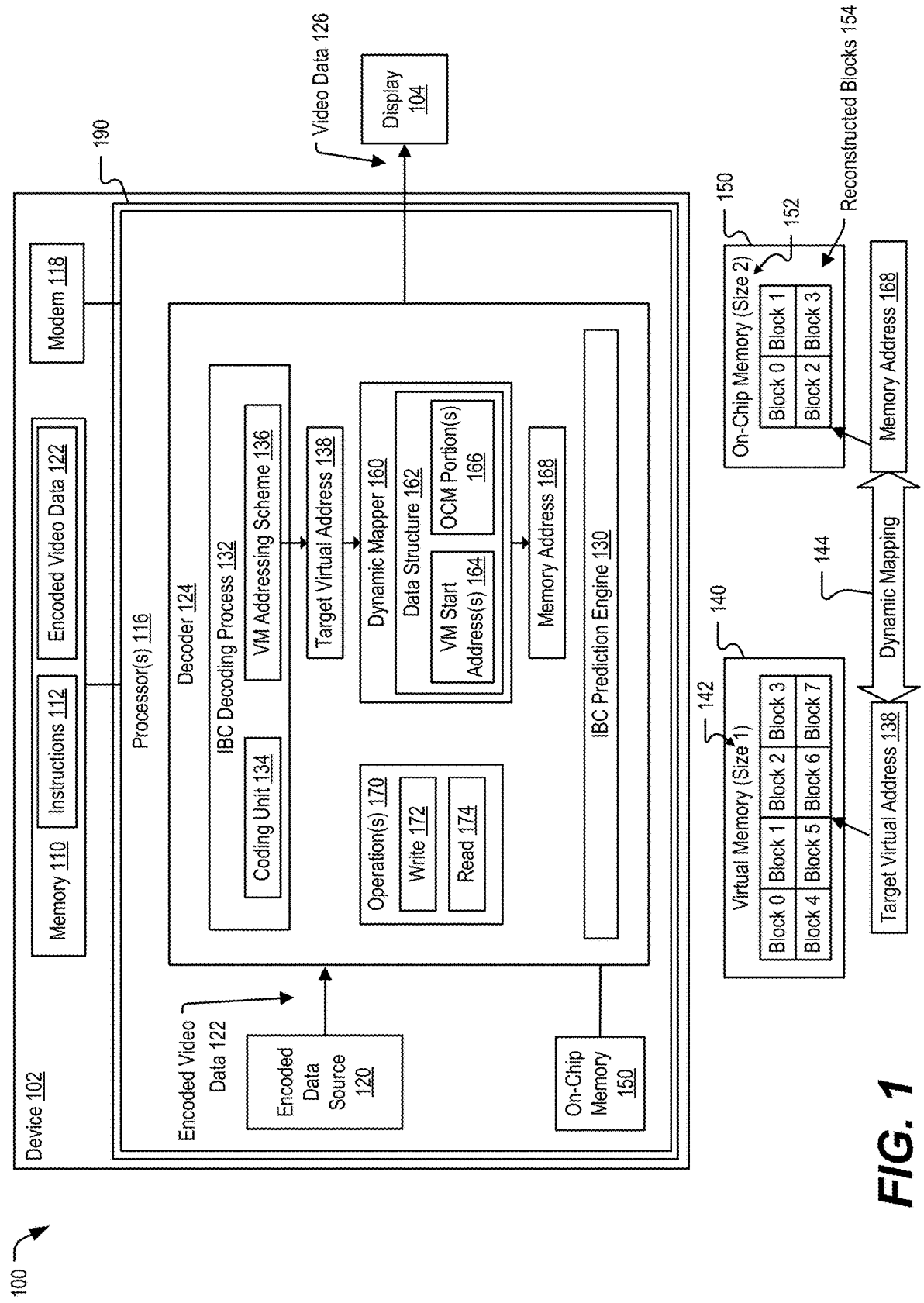
FIG. 1 is a block diagram illustrating an example of an implementation of a system operable to perform IBC decoding using dynamic mapping to access on-chip memory, in accordance with some examples of the present disclosure.

Systems and methods to perform IBC decoding using dynamic mapping to access on-chip memory are disclosed. Conventional video coding techniques using an intra-block copy (IBC) coding mode, such as a VVC IBC implementation, specify buffering of a relatively large number of previously decoded pixels (e.g., 256×128 pixels, or 61 kilobytes (Kbytes)), that were decoded prior to the current coding unit being decoded, to be available for fetch after reconstruction. While on-chip and off-chip solutions to this access requirement are expensive in terms of area, and implementation of an on-chip 61 Kbyte SRAM may be prohibitively expensive, off-chip storage using cached-DMA also incurs higher power consumption and increased access latency. Therefore, off-chip storage using cached-DMA can also result in reduced performance, as compared to on-chip storage.

The disclosed systems and methods include techniques to enable access to reconstructed pixels using on-chip storage by dynamically remapping virtual addresses of segments of the IBC decoded pixel buffer that are un-used during the decoding based on windows of the reconstructed pixels that are eligible for fetch as the decoding progresses. In a VVC IBC implementation, this remapping can reduce the memory requirement of the buffer by 50% (e.g., reducing the required memory to 30.5 Kbytes), enabling IBC buffering to be performed completely on-chip. Performing IBC buffering completely on-chip can eliminate the need for one or more other buffers associated with conventional approaches that do not use dynamic remapping to on-chip memory, such as a buffer (e.g., a 15 Kbyte buffer) to support ping-pong DMA writes of reconstructed pixels in a conventional approach that uses cached-DMA with the larger (e.g., 61 Kbyte) memory requirement. In addition, according to some aspects, one or more other buffers, such as a reconstruction to loop-filter data buffer, can be merged into the disclosed on-chip buffer, further reducing the overall amount of memory used to implement video decoding.

By implementing dynamic mapping to reduce IBC buffer memory requirements, IBC buffering can be implemented completely on-chip, enabling 1-cycle latency access of buffered pixel data from SRAM and avoiding the latency bottleneck associated with off-chip access that would otherwise inhibit decoder performance. In addition, area reductions may be obtained by merging other data buffers into the on-chip buffer. Further, using on-chip SRAM results in power savings as compared to using cached-DMA involving larger memories and additional input/output accesses.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 is depicted that includes a device 102 that is coupled to a display device 104 and that is configured to perform IBC decoding using dynamic mapping to access on-chip memory. The device 102 includes a memory 110 coupled to one or more processors 116 and configured to store instructions 112. The one or more processors 116 are configured to execute the instructions 112 to perform operations associated with decoding encoded video data 122 at a decoder 124. In various implementations, some or all of the functionality associated with the decoder 124 is preformed via execution of the instructions 112 by the processors 116, performed by processing circuitry of the processors 116 in a hardware implementation, or a combination thereof.

The one or more processors 116 include the decoder 124 coupled to an encoded data source 120. The decoder 124 is configured to obtain the encoded video data 122 from the encoded data source 120. For example, the encoded data source 120 may correspond to a portion of one or more of media files (e.g., a media file including the encoded video data 122 that is retrieved from the memory 110), a game engine, one or more other sources of video information, such as a remote media server, or a combination thereof. In a particular implementation, the encoded video data 122 corresponds to VVC IBC encoded video data.

The device 102 also includes a modem 118 coupled to the decoder 124 and configured to enable communication with one or more other devices, such as via one or more wireless networks. According to some aspects, the modem 118 is configured to receive the encoded video data 122 from a second device, such as video data that is streamed from a remote server for playback at the device 102.

The decoder 124 is configured to access an on-chip memory 150 via one or more operations 170, such as a write operation 172 or a read operation 174. In a particular implementation, the on-chip memory 150 and the decoder 124 are integrated into a single substrate 190 (e.g., a single chip). Although the on-chip memory 150 is illustrated as distinct from and coupled to the decoder 124, in other implementations the on-chip memory 150 is integrated in the decoder 124 as a local buffer. According to an aspect, the on-chip memory 150 comprises a static random access memory (SRAM) IBC circular buffer.

According to an aspect, the decoder 124 is configured to perform an IBC decoding process 132 for each IBC encoded coding unit of the encoded video data 122 to generate a reconstructed block of video data. The IBC decoding process 132 may be performed in conjunction with an IBC prediction engine 130 of the decoder 124. To illustrate, the IBC prediction engine 130 may be configured to receive data extracted from the encoded video data 122 that indicates one or more motion vectors associated with a current coding unit 134. The IBC prediction engine 130 may initiate the IBC decoding process 132 to retrieve pixel data of one or more recently reconstructed blocks indicated by the one or more motion vectors, merge the reconstructed pixels to generate predicted pixels for the current coding unit, and buffer the predicted pixels for further processing. The predicted pixels may be stored (e.g., buffered) in the on-chip memory 150 and may be accessed by the decoder 124 for further processing, such as to generate reconstructed pixels, to perform loop filtering, etc., as described further with reference to FIG. 3.

The decoder 124 is configured to identify, during the IBC decoding process 132 on at least a portion of the coding unit 134 of the encoded video data 122, a target virtual address 138 for data access associated with a particular operation 170 of the IBC decoding process 132, such as a read operation 174 to retrieve recently reconstructed pixel data or a write operation 172 to store predicted pixel data. The target virtual address 138 is generated according to an addressing scheme 136 of a virtual memory 140 used by the IBC decoding process 132, such as a VVC addressing scheme for IBC decoding.

In a particular implementation, the virtual memory 140 corresponds to a virtual buffer that, according to a VVC specification, has a first size 142 that is sufficient to store eight 64×64 blocks of pixel data in a rectangular layout that has a row width of 256 pixels and a column height of 128 pixels, arranged in two block rows and four block columns (also referred to as "sub-rows" and "sub-columns," respectively). In an example in which 15 bits of combined luma and chroma data are associated with each pixel, storage of pixel data associated with 256×128 pixels requires the first size 142 to be at least 61,440 bytes, which can be prohibitively expensive in terms of on-chip area. However, reading and writing pixel data at an off-chip memory (e.g., via DMA to a DRAM) introduces a much larger access latency as compared to using an on-chip buffer, resulting in reduced decoder performance.

The decoder 124 includes a dynamic mapper 160 that is configured to dynamically map the target virtual address 138 to a particular memory address 168 of a portion of the on-chip memory 150. The on-chip memory 150 is configured to store reconstructed blocks 154 of the video data 122 and may operate as an SRAM IBC circular buffer having a second size 152 that is smaller than the first size 142 of the virtual memory 140. In a particular implementation, the first size 142 of the virtual memory 140 is at least two times larger than the second size 152 of the on-chip memory 150.

To illustrate, although a VVC specification may specify accesses to the eight-block virtual memory 140 via the virtual memory addressing scheme 136, one or more other aspects of the VVC specification may restrict a motion vector size for intra-block prediction such that, at most, four blocks of pixel data (e.g., a current block and the three most recently reconstructed blocks) are accessed during the IBC decoding process 132. As a result, the dynamic mapper 160 can map portions of the virtual memory 140 corresponding to the four accessible blocks of pixel data to four portions of the on-chip memory 150. As illustrated, the dynamic mapper 160 is configured to perform a dynamic mapping 144 that maps the target virtual address 138 associated with a particular block (e.g., "Block 6") of the eight blocks of the virtual memory 140 to the particular memory address 168 associated with another particular block (e.g., "Block 2") of the four blocks illustrated in the on-chip memory 150. An example of operation of the dynamic mapper 160 is described further with reference to FIG. 2.

The dynamic mapper 160 is configured to populate and update a data structure 162 that associates one or more virtual memory start addresses 164 with one or more portions 166 of the on-chip memory 150. For example, the data structure 162 may include one or more arrays, lists, or tables, as illustrative, non-limiting examples, that associate a virtual memory start address for "Block 6" of the virtual memory 140 with the "Block 2" portion of the on-chip memory 150. An example of populating and updating the data structure 162 in conjunction with writing data to the on-chip memory 150 is described further in FIG. 2.

The decoder 124 is configured to access the on-chip memory 150 using the particular memory address 168 to perform the particular operation 170 of the IBC decoding process 132. For example, in response to the particular operation 170 corresponding to a write operation 172 to write a block of pixel data to an unused portion of the virtual memory 140, the decoder 124 (e.g., the dynamic mapper 160) is configured to store a virtual memory start address for the block of pixel data into the data structure 162. As another example, in response to the particular operation 170 corresponding to a read operation 174 to read a block of pixel data from the virtual memory 140, the decoder 124 is configured to locate a virtual memory start address for the block of pixel data in the data structure 162 to identify a corresponding portion of the on-chip memory 150 from which the pixel data can be retrieved.

Figure 3:
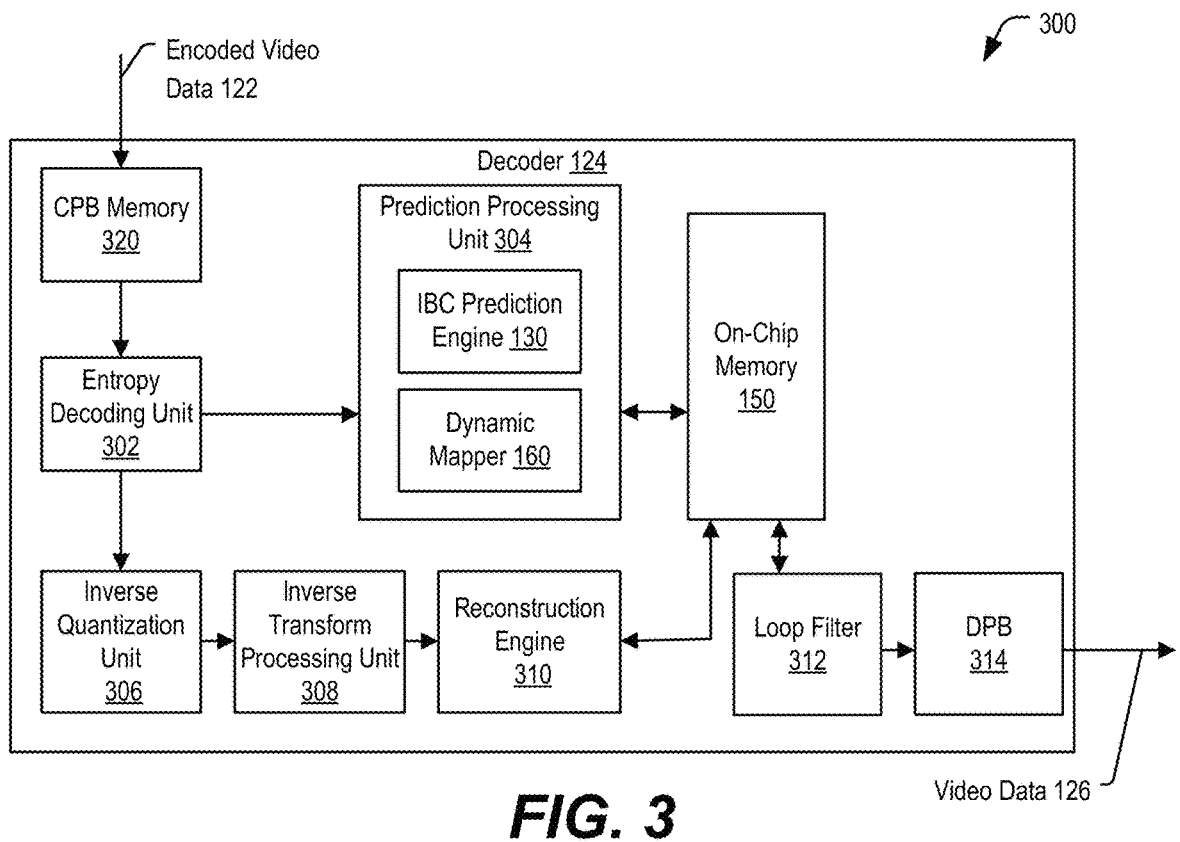
FIG. 3 is a block diagram illustrating an example of components of a decoder that can be implemented in the system of FIG. 1, in accordance with some examples of the present disclosure.

The decoder 124 may be configured to perform additional processing of the reconstructed blocks of the encoded video data 122 to generate video data 126, such as described further with reference to FIG. 3. According to an aspect, the video data 126 can be provided to the display device 104 for viewing by a user of the device 102.

During operation, the encoded video data 122 is processed by the decoder 124 to generate the video data 126. Intra-block coded portions of the encoded video data 122 are processed by the IBC prediction engine 130 to generate predicted pixels for a current block based on pixels of previously reconstructed blocks in the same frame as the current block. Each target virtual address 138 for the virtual memory 140 that is generated by the virtual memory addressing scheme 136, such as to retrieve reconstructed pixels or to store predicted pixels, is mapped by the dynamic mapper 160 to a corresponding particular memory address 168 in the on-chip memory 150. The dynamic mapper 160 may update the data structure 162 as each block is processed so that the on-chip memory 150 operates as a circular buffer that maintains pixel data corresponding to the current block and blocks that are within the permitted motion vector range for IBC coding, and overwrites pixel data of reconstructed blocks that are no longer within the permitted motion vector range of the current block.

Sizing the on-chip memory 150 to include the reconstructed blocks that are accessible to motion vectors for a current block while omitting reconstructed blocks that are no longer accessible to the motion vectors enables the on-chip memory 150 to be significantly smaller than (e.g., half the size of) the virtual memory 140. In addition, using the dynamic mapper 160 to map the virtual memory start addresses 164 provided by the virtual memory addressing scheme 136 to the portions 166 of the on-chip memory 150 enables read and write access for IBC operations without modification to the virtual memory addressing scheme 136 (since modifying the virtual memory addressing scheme 136 may result in the decoder 124 no longer being in compliance with a video coding standard). Thus, the on-chip memory 150 can provide on-chip storage of the accessible reconstructed blocks, based on the virtual memory addressing scheme 136, without prohibitive expense in terms of chip area and with reduced latency and power consumption as compared to off-chip storage.

Figure 6:
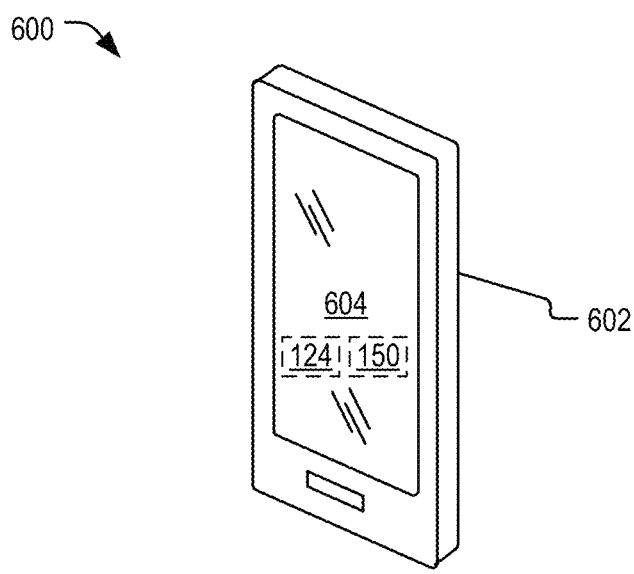
FIG. 6 is a diagram of an implementation of a portable electronic device operable to perform IBC decoding using dynamic mapping to access on-chip memory, in accordance with some examples of the present disclosure.
Figure 7:
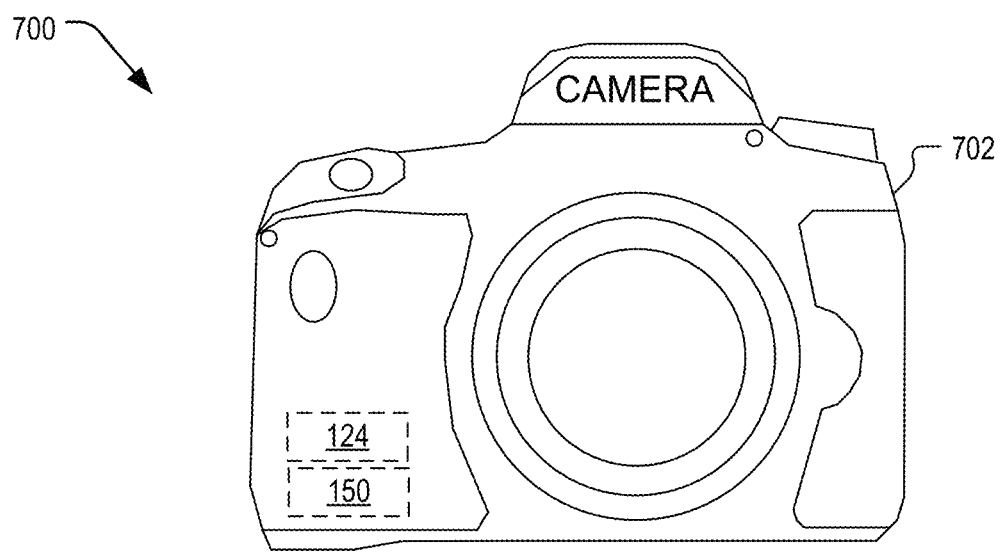
FIG. 7 is a diagram of a camera operable to perform IBC decoding using dynamic mapping to access on-chip memory, in accordance with some examples of the present disclosure.
Figure 8:
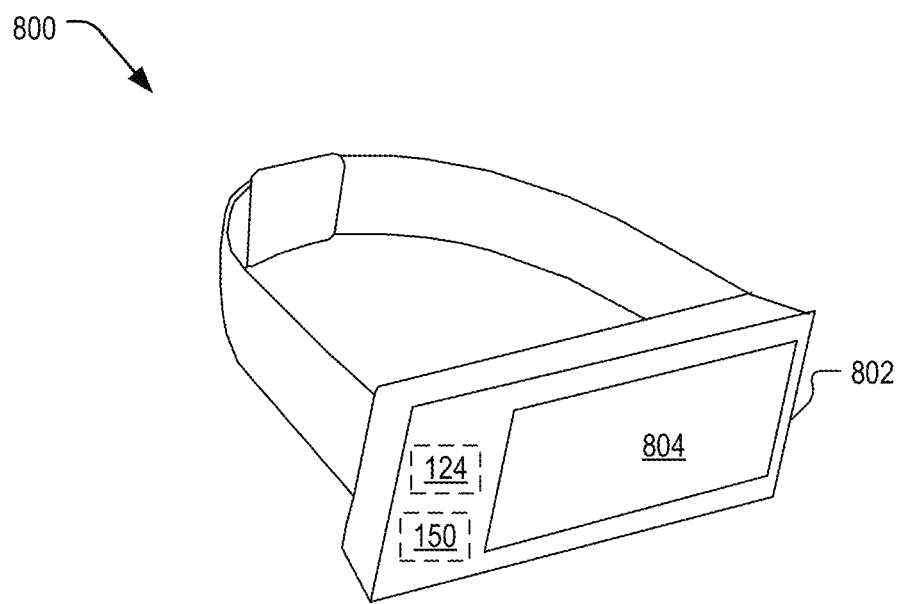
FIG. 8 is a diagram of a wearable electronic device operable to perform IBC decoding using dynamic mapping to access on-chip memory, in accordance with some examples of the present disclosure.
Figure 9:
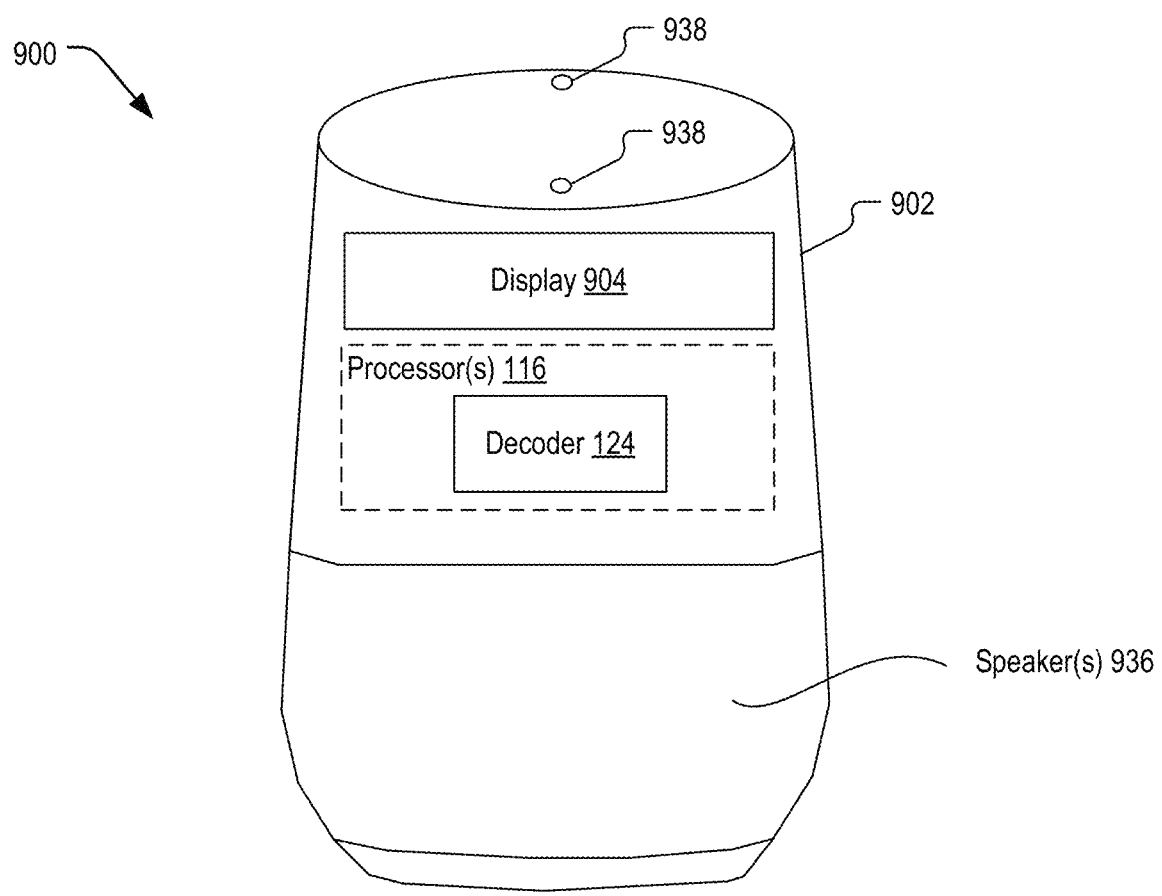
FIG. 9 is a diagram of a voice-controlled speaker system operable to perform IBC decoding using dynamic mapping to access on-chip memory, in accordance with some examples of the present disclosure.
Figure 10:
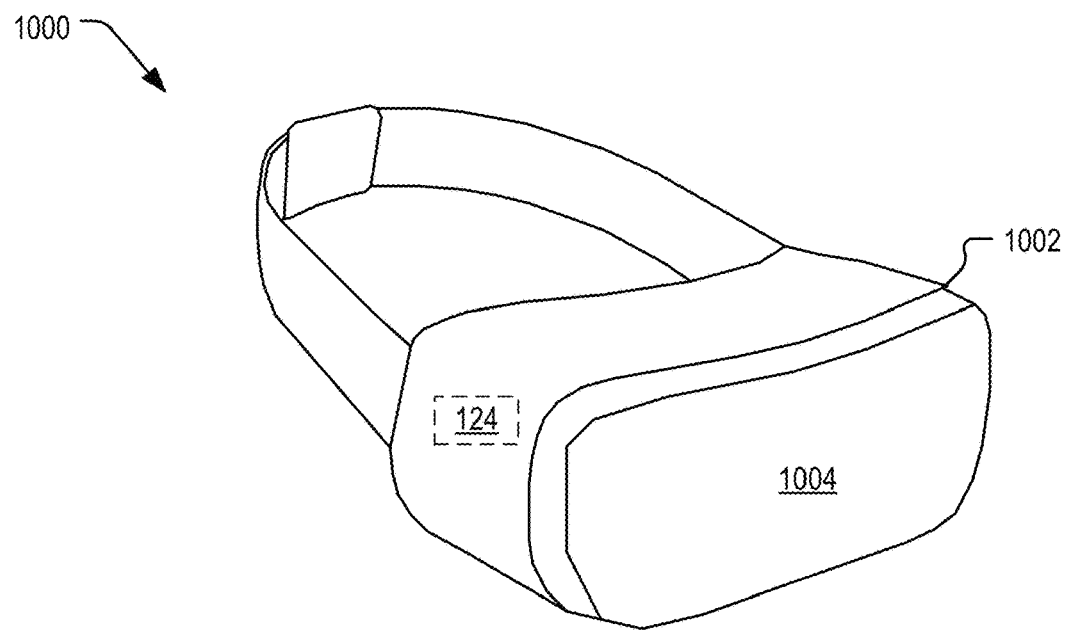
FIG. 10 is a diagram of a headset, such as a virtual reality or augmented reality headset, operable to perform IBC decoding using dynamic mapping to access on-chip memory, in accordance with some examples of the present disclosure.
Figure 11:
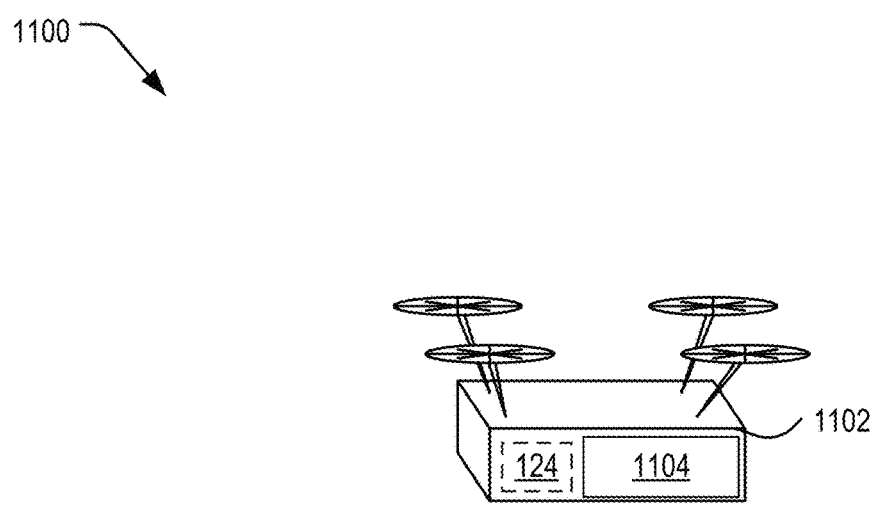
FIG. 11 is a diagram of a first example of a vehicle operable to perform IBC decoding using dynamic mapping to access on-chip memory, in accordance with some examples of the present disclosure.
Figure 12:
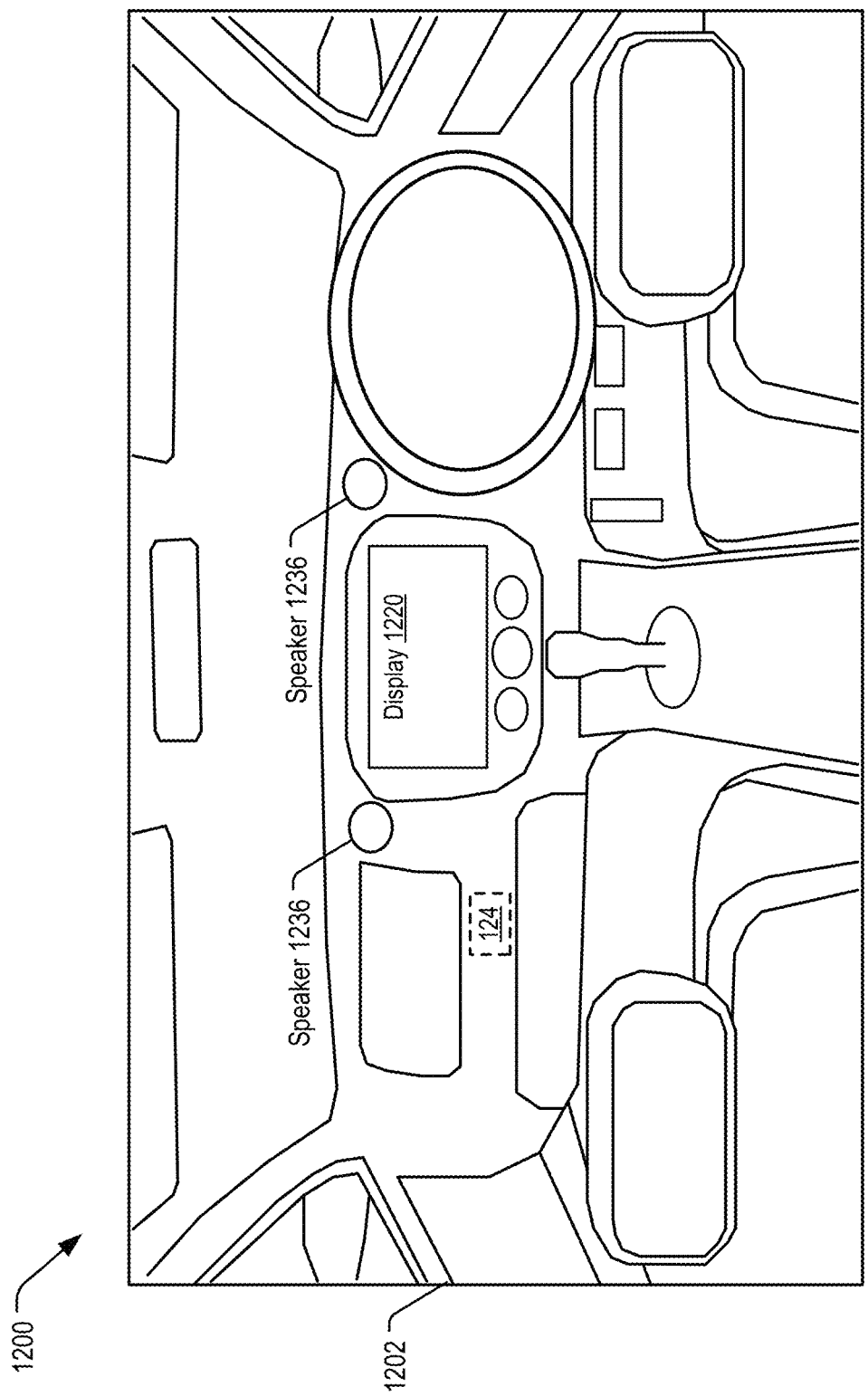
FIG. 12 is a diagram of a second example of a vehicle operable to perform IBC decoding using dynamic mapping to access on-chip memory, in accordance with some examples of the present disclosure.

According to some aspects, the decoder 124 and the on-chip memory 150 are integrated in at least one of a mobile phone or a tablet computer device, such as illustrated in FIG. 6. According to some aspects, the decoder 124 and the on-chip memory 150 are integrated in a wearable electronic device as illustrated in FIG. 8, a voice-controlled speaker system as illustrated in FIG. 9, or a camera device as illustrated in FIG. 7. According to some aspects, the one or more processors 116 are integrated in a virtual reality headset, a mixed reality headset, or an augmented reality headset as illustrated in FIG. 10, or a vehicle as illustrated in FIG. 11 and FIG. 12.

Although the display device 104 is illustrated as included in (e.g., integrated with) the device 102, in other implementations, the display device 104 is coupled to, but not included, in the device 102. Although specific examples of sizes and layouts of the virtual memory 140 and the on-chip memory 150 are described for purposes of illustration, it should be understood that the techniques described herein may be used in conjunction with other sizes of the virtual memory 140, the on-chip memory 150, or both. For example, although a 50% memory size reduction is described via use of the dynamic mapping 114 in conjunction with particular aspects of a VVC IBC implementation, other amounts of memory size reduction may be attained in implementations that use other IBC coding standards (e.g., which may have different ranges of predicted blocks that are accessible via motion vectors of the current block). Thus, the examples presented herein are to be regarded as illustrative rather than limiting. In addition, although a graphical representation of the virtual memory 140 is depicted, it should be understood that the virtual memory 140 represents a logical model of memory used by the virtual memory addressing scheme 136 and, according to the present disclosure, does not represent physical memory or any other physical devices for data storage.

Figure 2:
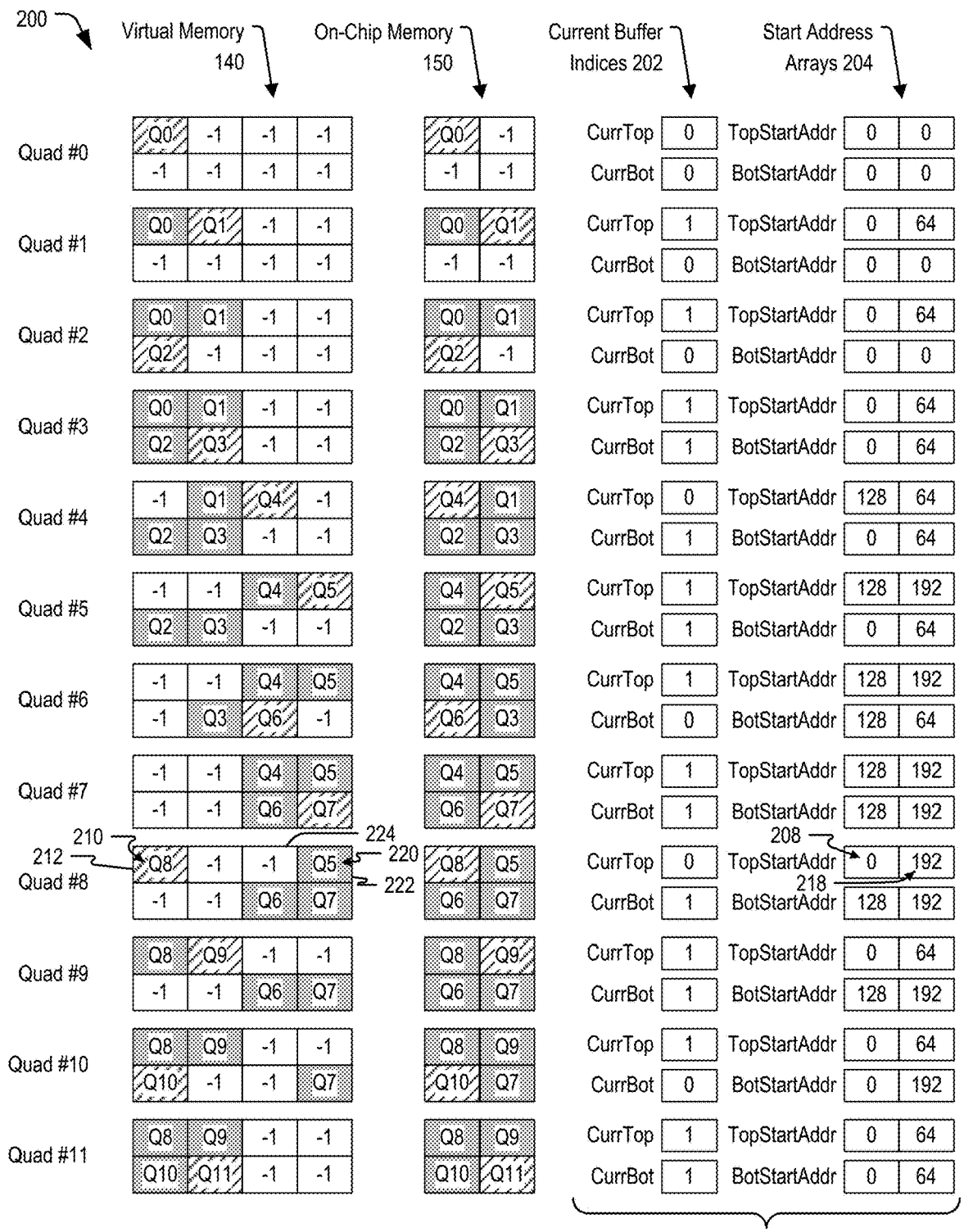
FIG. 2 is a diagram illustrating a particular implementation of dynamically mapping virtual memory addresses to portions of an on-chip memory that can be used in the system of FIG. 1, in accordance with some examples of the present disclosure.

FIG. 2 illustrates an example 200 depicting states of the virtual memory 140, the on-chip memory 150, and the data structure 162 after each of a sequence of IBC write operations are performed, e.g., as a sequence of Quad 64×64 blocks are decoded and reconstructed for a CTB size of 128×128 pixels. The states of the virtual memory 140 illustrate the location of stored data in virtual memory as designated by the virtual memory addressing scheme 136, and the states of the on-chip memory 150 illustrate the location of the stored data in physical memory using the mapping performed by the dynamic mapper 160. In the example 200, each block of the virtual memory 140 and the on-chip memory 150 represents a quad 64×64 of a 128×128 sized CTB. However, in other implementations, the illustrated sequence of states is also representative for CTB sizes of 64×64 and 32×32, but at a CTB level rather than a Quad 64×64 level.

Blocks in the virtual memory 140 and the on-chip memory 150 are illustrated as having one of three possible states: "−1" indicating that the block is not accessible for fetch (e.g., the block is out of range of motion vectors); hatched (diagonal lines) indicating that the current Quad 64×64 is active (e.g., prediction and reconstruction is in process); and shaded indicating a Quad 64×64 for which reconstruction is complete and which is accessible for fetch.

The data structure 162 includes two current buffer indices 202: CurrTop, which indicates which sub-column of the top sub-row of the on-chip memory 150 is the current (or most recently used), with "0" indicating the left sub-column and "1" indicating the right sub-column; and CurrBot, which indicates which sub-column of the bottom sub-row of the on-chip memory 150 is the current (or most recently used) sub-column, with "0" indicating the left sub-column and "1" indicating the right sub-column. The data structure 162 also includes two start address arrays 204: TopStartAddr and BotStartAddr. TopStartAddr is a two-element array, with the left array element storing the start address (as indicated in the addressing scheme of the virtual memory 140) of the Quad 64×64 stored in the left sub-column of the top sub-row of the on-chip memory 150, and the right array element storing the start address of the Quad 64×64 stored in the right sub-column of the top sub-row of the on-chip memory 150. Similarly, BotStartAddr is a two-element array, with the left array element storing the start address (as indicated in the addressing scheme of the virtual memory 140) of the Quad 64×64 stored in the left sub-column of the bottom sub-row of the on-chip memory 150, and the right array element storing the start address of the Quad 64×64 stored in the right sub-column of the bottom sub-row of the on-chip memory 150.

At slice initialization, all blocks of the virtual memory 140 and the on-chip memory 150 are set to −1, the current buffer indices 202 are set to 0, and the elements of the start address arrays 204 are set to 0. During processing of Quad #0 (e.g., a first Quad 64×64, also denoted Q0), the upper left block at row 0, column 0 of the virtual memory 140 is denoted as active and the left block of the top sub-row of the on-chip memory 150 is denoted as active. The current buffer indices 202 and the start address arrays 204 remain unchanged because the left sub-column of the top sub-row of the on-chip memory 150 is active (e.g., CurrTop=0), and the start address of Quad #0 in the top sub-row of the virtual memory 140 is 0 (e.g., TopStartAddr(0)=0).

During processing of Quad #1 (e.g., a second Quad 64×64, also denoted Q1), the block in the top sub-row, second sub-column (row 0, column 64) of the virtual memory 140 is indicated as active, and the right block of the top sub-row of the on-chip memory 150 is indicated as active. CurrTop is set to 1, and the start address (e.g., column 64) of Quad #1 in the top sub-row of the virtual memory 140 is stored in TopStartAddr(1) (e.g., TopStartAddr(1)=64). The block storing Quad #0 is indicated as complete in the virtual memory 140 and the on-chip memory 150.

During processing of Quad #2, the block in the bottom sub-row, first sub-column (row 64, column 0) of the virtual memory 140 is indicated as active, and the left block of the bottom sub-row of the on-chip memory 150 is indicated as active. CurrBot remains 0, and the start address (e.g., column 0) of Quad #2 in the bottom sub-row of the virtual memory 140 is stored in BotStartAddr(0) (e.g., BotStartAddr(0)=0). The block storing Quad #1 is indicated as complete in the virtual memory 140 and the on-chip memory 150.

During processing of Quad #3, the block in the bottom sub-row, second sub-(row 64, column 64) of the virtual memory 140 is indicated as active, and the right block of the bottom sub-row of the on-chip memory 150 is indicated as active. CurrBot is set to 1, and the start address (e.g., column 64) of Quad #3 in the bottom sub-row of the virtual memory 140 is stored in BotStartAddr(1) (e.g., BotStartAddr(1)=64). The block storing Quad #2 is indicated as complete in the virtual memory 140 and the on-chip memory 150.

During processing of Quad #4, the block in the top sub-row, third sub-column (row 0, column 128) of the virtual memory 140 is indicated as active, and the left block of the top sub-row of the on-chip memory 150 is indicated as active, with the reconstructed data of Quad #0 being replaced by Quad #4 in the on-chip memory 150. CurrTop is set to 0, and the start address (e.g., column 128) of Quad #4 in the top sub-row of the virtual memory 140 is stored in TopStartAddr(0) (e.g., TopStartAddr(0)=128). The block storing Quad #3 is indicated as complete in the virtual memory 140 and the on-chip memory 150. Because Quad #0 is out of motion vector range of Quad #4, the block associated with Quad #0 is set to −1 in the virtual memory 140 (e.g., out of fetch range and therefore no longer used).

States of the virtual memory 140, the on-chip memory 150, and the data structure 162 are illustrated for processing of Quad #5 to Quad #11, continuing the pattern described above.

After processing Quad #7, associated with the lower-right block of the virtual memory 140 (e.g., row 64, column 192), the virtual memory addressing scheme 136 wraps-around so that processing of Quad #8 is performed in the block in the top sub-row, first sub-column of the virtual memory 140. The block in the top sub-row, first sub-column (row 0, column 0) of the virtual memory 140 is indicated as active, and the left block of the top sub-row of the on-chip memory 150 is indicated as active, with the reconstructed data of Quad #4 being replaced by Quad #8 in the on-chip memory 150. CurrTop is set to 0, and the start address (e.g., column 0) of Quad #8 in the top sub-row of the virtual memory 140 is stored as TopStartAddr(0)=0. Because Quad #4 is out of motion vector range of Quad #8, a portion 224 of the virtual memory 140 associated with Quad #4 is set to −1 (e.g., out of fetch range and therefore no longer used).

Thus, in response to performing a write operation to write a block of pixel data 210 (e.g., Quad #8) to an unused portion 212 of the virtual memory 140, the decoder 124 is configured to store a virtual memory start address 208 for the block of pixel data 210 into the data structure 162 (e.g., in the TopStartAddr array). In a particular implementation, the virtual memory start address 208 for the block of pixel data 210 is based on another stored virtual memory start address 218 associated with another portion 222 of the virtual memory 140 (e.g., the start address (192) of a block of pixel data 220 for Quad #5 in the top-right block of the virtual memory 140 and the on-chip memory 150), increased by a block size (e.g., a block width of 64 pixels), and a modulo associated with a row size (e.g., 256) of the virtual memory 140. To illustrate, the virtual memory start address 208 for Quad #8 can be calculated as: virtual memory start address 208=((virtual memory start address 218)+64) % 256, where "%" indicates the modulus operator.

FIG. 3 depicts an illustrative example 300 of components that may be implemented in the decoder 124. In the particular example 300, the decoder 124 includes a coded picture buffer (CPB) memory 320, an entropy decoding unit 302, a prediction processing unit 304, an inverse quantization unit 306, an inverse transform processing unit 308, a reconstruction engine 310, a loop filter 312, the on-chip memory 150, and a decoded picture buffer (DPB) 314. In a particular implementation, the CPB memory 320, the entropy decoding unit 302, the prediction processing unit 304, the inverse quantization unit 306, the inverse transform processing unit 308, the reconstruction engine 310, the loop filter 312, the DPB 314, or any combination thereof, may be implemented in one or more processors or in processing circuitry.

The prediction processing unit 304 includes the IBC prediction engine 130 and the dynamic mapper 160. The prediction processing unit 304 may include additional units to perform prediction in accordance with other prediction modes. As examples, the prediction processing unit 304 may include a motion compensation unit, an intra-prediction unit, a palette unit, an affine unit, a linear model (LM) unit, one or more other units configured to prediction, or a combination thereof.

The CPB memory 320 may store video data, such as the encoded video data 122 (e.g., an encoded video bitstream), to be decoded. The CPB memory 320 may include a CPB that stores encoded video data (e.g., syntax elements) and may also store video data other than syntax elements of a coded picture, such as temporary data representing outputs from the various units of the decoder 124. The DPB 314 generally stores decoded pictures, which the decoder 124 may output as the video data 126, use as reference video data when decoding subsequent data or pictures of the encoded video bitstream, or both. The CPB memory 320 and the DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. The CPB memory 320 and the DPB 314 may include the same memory device or separate memory devices.

The various units shown in FIG. 3 are illustrated to assist with understanding the operations performed by the decoder 124 in accordance with some implementations. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

The entropy decoding unit 302 receives encoded video data from the CPB memory 320 and entropy decodes the encoded video data 122 to reproduce syntax elements. The prediction processing unit 304, the inverse quantization unit 306, the inverse transform processing unit 308, the reconstruction engine 310, and the loop filter 312 may generate decoded video data based on the syntax elements extracted from the bitstream.

In general, the decoder 124 reconstructs a picture on a block-by-block basis. The decoder 124 may perform a reconstruction operation on each block individually (where the block currently being reconstructed, i.e., decoded, may be referred to as a "current block").

The entropy decoding unit 302 may entropy decode syntax elements defining quantized transform coefficients of a quantized transform coefficient block, as well as transform information, such as a quantization parameter (QP) and/or transform mode indication(s). The inverse quantization unit 306 may use the QP associated with the quantized transform coefficient block to determine a degree of quantization and a degree of inverse quantization for the inverse quantization unit 306 to apply. The inverse quantization unit 306 may, for example, perform a bitwise left-shift operation to inverse quantize the quantized transform coefficients. The inverse quantization unit 306 may thereby form a transform coefficient block including transform coefficients.

After the inverse quantization unit 306 forms the transform coefficient block, the inverse transform processing unit 308 may apply one or more inverse transforms to the transform coefficient block to generate a residual block associated with the current block. For example, the inverse transform processing unit 308 may apply an inverse discrete cosine transform (DCT), an inverse integer transform, an inverse Karhunen-Loeve transform (KLT), an inverse rotational transform, an inverse directional transform, or another inverse transform to the coefficient block.

In addition, the prediction processing unit 304 generates a prediction block according to prediction information syntax elements that were entropy decoded by the entropy decoding unit 302. For example, if the prediction information syntax elements indicate that the current block is inter-predicted, a motion compensation unit (not shown) may generate the prediction block. In this case, the prediction information syntax elements may indicate a reference picture in the DPB 314 from which to retrieve a reference block, as well as a motion vector identifying a location of the reference block in the reference picture relative to the location of the current block in the current picture.

As another example, if the prediction information syntax elements indicate that the current block is intra-predicted, an intra-prediction unit (not shown) may generate the prediction block according to an intra-prediction mode indicated by the prediction information syntax elements. The intra-prediction unit 318 may retrieve data of neighboring samples to the current block from the DPB 314.

The prediction processing unit 304 may also determine to decode blocks of video data using an intra block copy (IBC) mode using the IBC prediction engine 130. In general, in IBC mode, the decoder 124 may determine predictive blocks for a current block, where the predictive blocks are in the same frame as the current block. The predictive blocks may be identified by a block vector (e.g., a motion vector) and limited to the locations of blocks that have already been decoded. As described previously, the IBC prediction engine 130 may use the virtual memory addressing scheme 136 to generate a target virtual address 138 for a predictive block, and the dynamic mapper 160 may map the target virtual address 138 to a particular memory address 168 corresponding to a portion of the on-chip memory 150.

The reconstruction engine 310 may reconstruct the current block using the prediction block and the residual block. For example, the reconstruction engine 310 may add samples of the residual block to corresponding samples of the prediction block in the on-chip memory 150 to reconstruct the current block in the on-chip memory 150.

The loop filter 312 may perform one or more filter operations on reconstructed blocks. For example, the loop filter 312 may access reconstructed blocks in the on-chip memory 150 and perform deblocking operations to reduce blockiness artifacts along edges of the reconstructed blocks. Thus, the decoder 124 is configured to access the on-chip memory 150 during performance of a loop filtering operation performed by the loop filter 312 and associated with the IBC decoding process. Operations of the loop filter 312 are not necessarily performed in all examples.

The decoder 124 may store the reconstructed blocks in the DPB 314, which may be implemented as off-chip memory to have a larger storage capacity than the on-chip memory 150. As discussed above, the DPB 314 may provide reference information, such as samples of a current picture for intra-prediction and previously decoded pictures for subsequent motion compensation, to the prediction processing unit 304. Moreover, the decoder 124 may output decoded pictures from the DPB 314 for subsequent presentation on a display device, such as the video data 126 provided to the display device 104 of FIG. 1.

Figure 4:
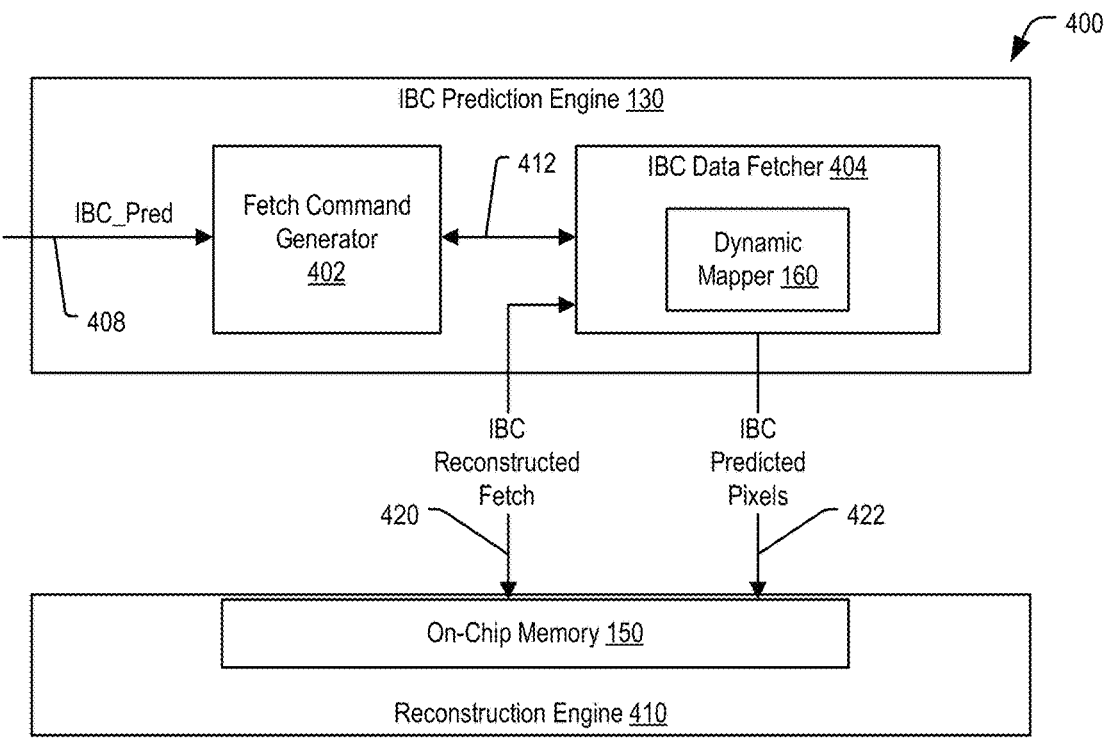
FIG. 4 is a block diagram illustrating another example of components of a decoder that can be implemented in the system of FIG. 1, in accordance with some examples of the present disclosure.

FIG. 4 is a block diagram illustrating an example 300 of components that may be implemented in the decoder 124 according to a particular implementation. The IBC prediction engine 130 is illustrated as including a fetch command generator 402 and an IBC data fetcher 404. The IBC prediction engine 130 is coupled to a reconstruction engine 410 that includes the on-chip memory 150.

The fetch command generator 402 is configured to receive a prediction command 408 (IBC_Pred) and to generate one or more fetch commands 412 for the IBC data fetcher 404. The IBC data fetcher 404 includes the dynamic mapper 160 to map virtual addresses received with the fetch commands 412 to memory addresses for reading reconstructed pixel data from the on-chip memory 150. The reconstructed pixel data is retrieved from the on-chip memory 150 via one or more IBC reconstructed fetch operations 420. The IBC data fetcher 404 is further configured to generate predicted pixels based on the reconstructed pixel data and to write the predicted pixels to the on-chip memory 150 as IBC predicted pixels 422.

The reconstruction engine 410 includes the on-chip memory 150 and is configured to generate, based on the IBC predicted pixels 422 for a particular block and a residual for the particular block, reconstructed pixels for the particular block. In a particular implementation, the reconstruction engine 410 operates in a substantially similar manner as described for the reconstruction engine 310.

Although the dynamic mapper 160 is illustrated in the IBC data fetcher 404, in other implementations the dynamic mapper 160 may instead be implemented in the fetch command generator 402 to perform the mapping of virtual memory addresses to memory addresses for accessing the on-chip memory 150, which may be included in the fetch commands 412 to the IBC data fetcher 404.

Figure 5:
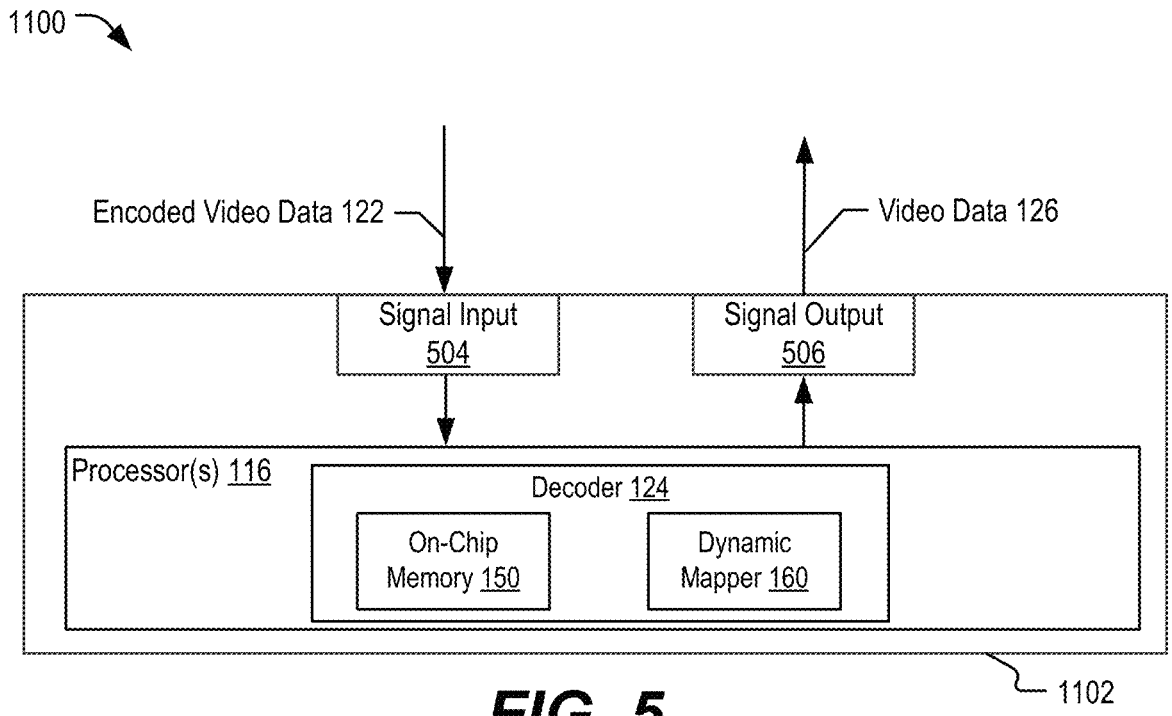
FIG. 5 is a block diagram illustrating an implementation of an integrated circuit operable to perform IBC decoding using dynamic mapping to access on-chip memory, in accordance with some examples of the present disclosure.

FIG. 5 is a block diagram illustrating an implementation 500 of the device 102 as an integrated circuit 502 for performing IBC decoding using dynamic mapping to access on-chip memory. The integrated circuit 502 includes the one or more processors 116, which include the decoder 124. The decoder 124 includes the on-chip memory 150 and the dynamic mapper 160. The integrated circuit 502 also includes a signal input 504, such as a bus interface, to enable the encoded video data 122 to be received. The integrated circuit 502 includes a signal output 506, such as a bus interface, to enable outputting the decoded video data 126. The integrated circuit 502 enables implementation of IBC decoding using dynamic mapping to access on-chip memory as a component in a system that performs video decoding playback, such as depicted in FIG. 1.

FIG. 6 depicts an implementation 600 in which the device 102 includes a mobile device 602, such as a phone or tablet, as illustrative, non-limiting examples. The mobile device 602 includes a display screen 604. Components of the one or more processors 116, including the decoder 124 and the on-chip memory 150, are integrated in the mobile device 602 and are illustrated using dashed lines to indicate internal components that are not generally visible to a user of the mobile device 602. In a particular example, the decoder 124 operates to perform IBC decoding using dynamic mapping to access the on-chip memory 150. For example, the mobile device 602 may receive encoded video data from a remote device (e.g., a phone or computer device of another participant on a video conference), decode the encoded video data using the decoder 124 including or coupled to the on-chip memory 150, and display the resulting decoded video at the display screen 604.

FIG. 7 depicts an implementation 700 in which the device 102 includes a portable electronic device that corresponds to a camera device 702. The decoder 124, the on-chip memory 150, a display device (e.g., not shown), or a combination thereof, are included in the camera device 702. During operation, the decoder 124 performs IBC decoding using dynamic mapping to access the on-chip memory 150 during playback of video data via the display device, such as video data captured by the camera device 702 and stored as encoded video data at a memory of the camera device 702.

FIG. 8 depicts an implementation 800 of a wearable electronic device 802, illustrated as a "smart watch." In a particular aspect, the wearable electronic device 802 includes the device 102. The decoder 124 is integrated into the wearable electronic device 802 and is coupled to, or includes, the on-chip memory 150. In a particular aspect, the wearable electronic device 802 is coupled to or includes a display screen 804 to display video data decoded by the decoder 124. In a particular example, the decoder 124 operates to perform IBC decoding using dynamic mapping to access the on-chip memory 150. In a particular example, the wearable electronic device 802 includes a haptic device that provides a haptic notification (e.g., vibrates) associated with playback of decoded video data via the display screen 804. For example, the haptic notification can cause a user to look at the wearable electronic device 802 to watch video playback, such as a video announcement of an incoming video phone call or a video message received at the wearable electronic device 802.

FIG. 9 is an implementation 900 of a wireless speaker and voice activated device 902. In a particular aspect, the wireless speaker and voice activated device 902 includes the device 102 of FIG. 1. The wireless speaker and voice activated device 902 can have wireless network connectivity and is configured to execute an assistant operation. The one or more processors 116 are included in the wireless speaker and voice activated device 902 and include the decoder 124, which includes (or is coupled to) the on-chip memory 150. In a particular aspect, the wireless speaker and voice activated device 902 includes one or more microphones 938 and one or more speakers 936, and also includes or is coupled to a display device 904 for playback of video that is output by the decoder 124. During operation, the decoder 124 performs IBC decoding using dynamic mapping to access on-chip memory during playback of video data via the display device 904. In response to receiving a verbal command via one or more microphones 938, the wireless speaker and voice activated device 902 can execute assistant operations, such as via execution of a voice activation system (e.g., an integrated assistant application). The assistant operations can include adjusting a temperature, playing media content such as stored or streaming audio and video content, turning on lights, etc. For example, the assistant operations are performed responsive to receiving a command after a keyword or key phrase (e.g., "hello assistant").

FIG. 10 depicts an implementation 1000 of a portable electronic device that corresponds to a virtual reality, augmented reality, or mixed reality headset 1002. In a particular aspect, the headset 1002 includes the device 102 of FIG. 1. The decoder 124 is integrated into the headset 1002. In a particular aspect, the decoder 124 includes or is coupled to the on-chip memory 150 and is configured to perform IBC decoding using dynamic mapping to access the on-chip memory 150 during playback of video data via a visual interface device 1004 (e.g., the display device 104). The visual interface device 1004 is positioned in front of the user's eyes to enable display of video associated with augmented reality, mixed reality, or virtual reality scenes to the user while the headset 1002 is worn.

FIG. 11 depicts an implementation 1100 in which the device 102 corresponds to or is integrated within a vehicle 1102, illustrated as a manned or unmanned aerial device (e.g., a package delivery drone). In some implementations, the one or more processors 116 (e.g., including the decoder 124) are integrated into the vehicle 1102.

The decoder 124 performs IBC decoding using dynamic mapping to access on-chip memory during playback of video data that is decoded by the decoder 124 and played back via a display device 1104. In some implementations, the vehicle 1102 is manned (e.g., carries a pilot, one or more passengers, or both), the display device 1104 is internal to a cabin of the vehicle 1102, and the IBC decoding is used during playback to a pilot or a passenger of the vehicle 1102. In another implementation, the vehicle 1102 is unmanned, the display device 1104 is mounted to an external surface of the vehicle 1102, and the IBC decoding is used during video playback to one or more viewers external to the vehicle 1102. For example, the vehicle 1102 may move (e.g., circle an outdoor audience during a concert) while playing out video such as advertisements or steaming video of the concert stage, and the one or more processors 116 (e.g., including the decoder 124) may perform IBC decoding using dynamic mapping to access on-chip memory to generate the video from an encoded video stream.

FIG. 12 depicts an implementation 1200 in which the device 102 corresponds to, or is integrated within, a vehicle 1202, illustrated as a car that also includes the decoder 124, a display device 1220, and speakers 1236. In some implementations, the decoder 124 and the on-chip memory 150 are integrated in the vehicle 1202, and the display device 1220 is configured to display video data output by the decoder 124. For example, the video data may correspond to streaming video data from a remote source (e.g., a remote media server), video stored at the vehicle 1202, such as entertainment content or instructional videos regarding operation of the vehicle 1202, or video captured via one or more camera sensors of the vehicle 1202, such as backup camera.

Figure 13:
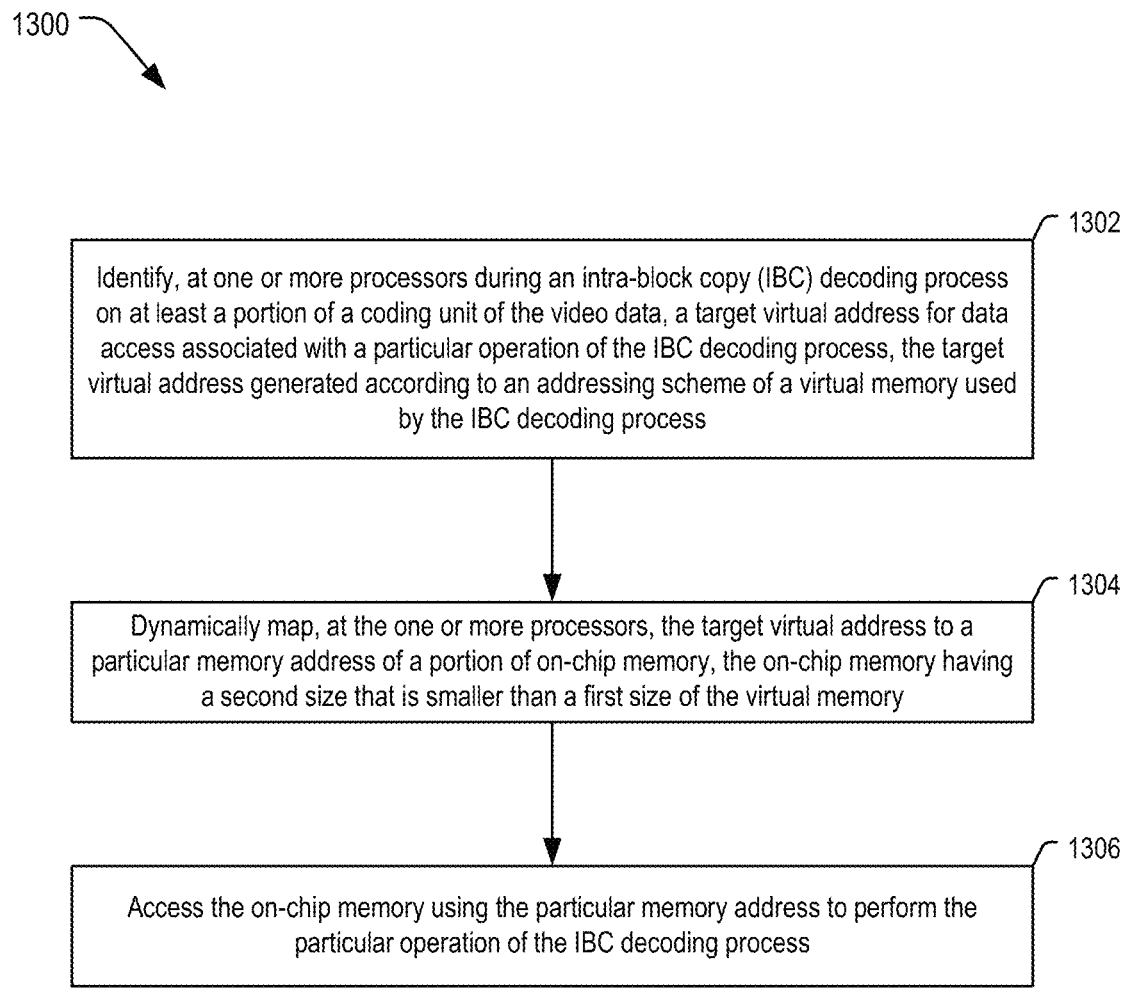
FIG. 13 is a diagram of a particular implementation of a method of performing IBC decoding using dynamic mapping to access on-chip memory, in accordance with some examples of the present disclosure.

FIG. 13 illustrates an example of a method 1300 of decoding video data. One or more operations of the method 1300 may be performed by the system 100 of FIG. 1 (e.g., the device 102, the one or more processors 116, or the decoder 124), as an illustrative, non-limiting example.

The method 1300 includes identifying, at one or more processors during an intra-block copy (IBC) decoding process on at least a portion of a coding unit of the video data, a target virtual address for data access associated with a particular operation of the IBC decoding process, at 1302. The target virtual address is generated according to an addressing scheme of a virtual memory used by the IBC decoding process. For example, the decoder 124 (e.g., the IBC prediction engine 130 executing the IBC decoding process 132) identifies the target virtual address 138 via the virtual memory addressing scheme 136 for performance of one or more operations 170, such as a write operation 172 (e.g., storing predicted pixels) or a read operation 174 (e.g., fetching reconstructed pixels for prediction). According to an aspect, the addressing scheme corresponds to a Versatile Video Coding (VVC) addressing scheme for IBC decoding.

The method 1300 includes dynamically mapping, at the one or more processors, the target virtual address to a particular memory address of a portion of on-chip memory, the on-chip memory having a second size that is smaller than a first size of the virtual memory, at 1304. For example, the dynamic mapper 160 performs the dynamic mapping 144 that maps the target virtual address 138 to the particular memory address 168 of a portion of the on-chip memory 150. According to an aspect, the on-chip memory includes a static random access memory (SRAM) IBC circular buffer.

The method 1300 includes accessing the on-chip memory using the particular memory address to perform the particular operation of the IBC decoding process, at 1306. For example, the decoder 124 access the on-chip memory 150 to perform the one or more operations 170 associated with the IBC decoding process 132.

In some implementations, a previously used virtual address in the virtual memory is mapped to the particular memory address prior to dynamically mapping the target virtual address to the particular memory address. For example, in FIG. 2, the address of the portion 224 (e.g., row 0, column 128) of the virtual memory 140 associated with Quad #4 was previously mapped to the upper left portion of the on-chip memory 150 prior to dynamically mapping the portion 212 (e.g., row 0, column 0) of the virtual memory 140 to the upper left portion of the on-chip memory 150 for storage of Quad #8.

In a particular implementation, the particular operation corresponds to a write operation to write a block of pixel data to an unused portion of the virtual memory, and dynamically mapping the target virtual address to the particular memory address includes storing a virtual memory start address for the block of pixel data in a data structure that associates virtual memory start addresses with portions of the on-chip memory. The virtual memory start address for the block of pixel data is based on another stored virtual memory start address associated with another portion of the on-chip memory, increased by a block size, and a modulo associated with a row size of the virtual memory. For example, during writing of the pixel data 210 of Quad #8 in FIG. 2, the virtual memory start address 208 of the portion 212 of the virtual memory 140 (e.g., column 0 of the top row) is written to one of the start address arrays 204 (e.g., TopStartAddr(0)). The virtual memory start address 208 is associated with the virtual memory start address 218 for the block of pixel data 220 of Quad #5 that is stored in the upper-right block of the on-chip memory 150, via the equation: virtual memory start address 208=((virtual memory start address 218)+64) % 256, as explained previously with regard to FIG. 2.

In a particular implementation, the particular operation corresponds to a read operation to read a block of pixel data from the virtual memory, and dynamically mapping the target virtual address to the particular memory address includes locating a virtual memory start address for the block of pixel data in a data structure that associates virtual memory start addresses with portions of the on-chip memory. For example, when reading the block of pixel data 220 associated with Quad #5 in FIG. 2, the target memory address for the portion 222 of the virtual memory 140 (e.g., row 0, column 192) is located in the start address arrays 204 (e.g., "192" is located in the right element of the TopStartAddr array (TopStartAddr(1)=192) and is therefore mapped to the upper-right portion of the on-chip memory 150 that stores the pixel data for Quad #5.

The method 1300 of FIG. 13 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1300 of FIG. 13 may be performed by a processor that executes instructions, such as described with reference to FIG. 14.

Figure 14:
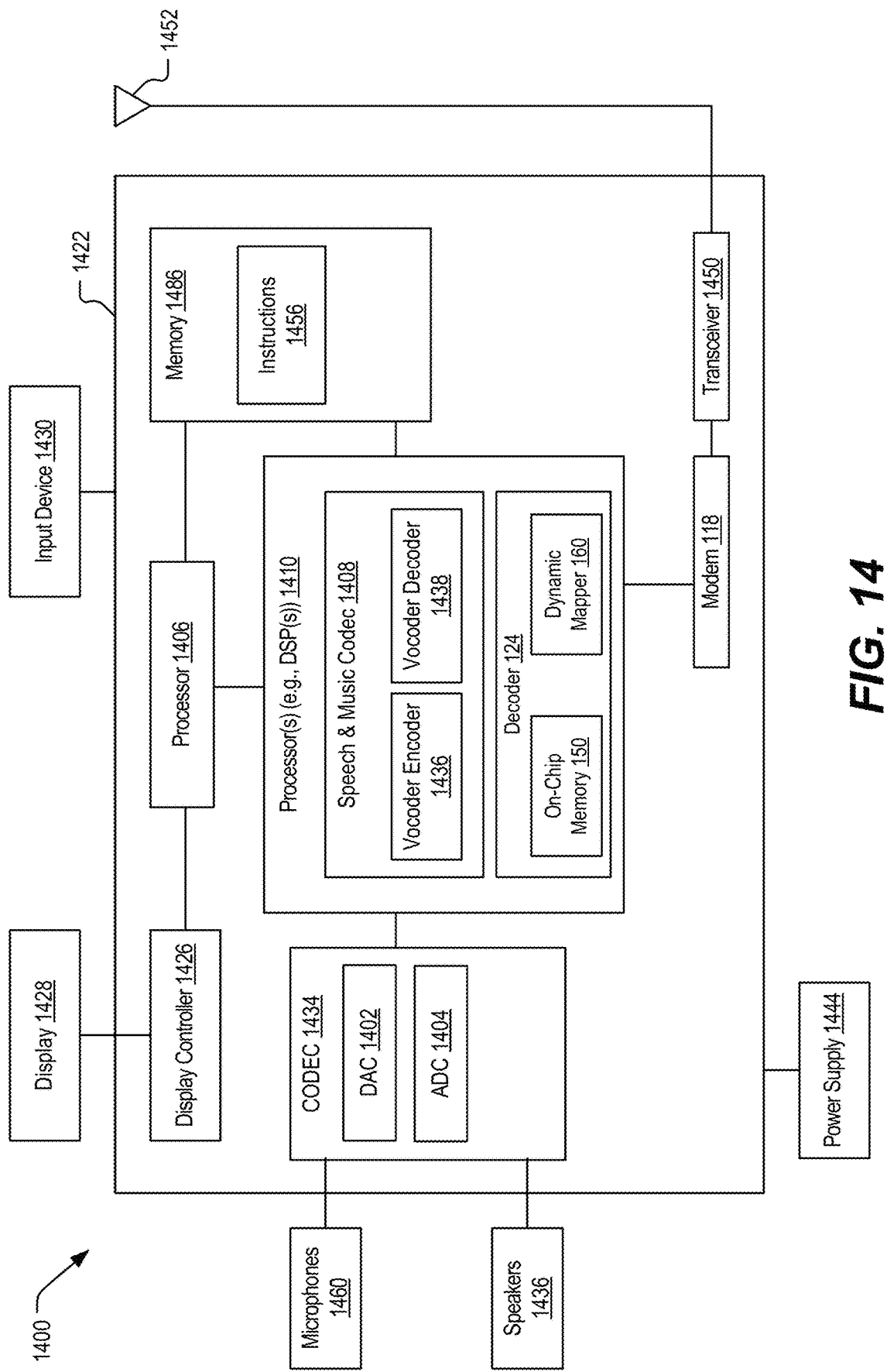
FIG. 14 is a block diagram of a particular illustrative example of a device that is operable to perform IBC decoding using dynamic mapping to access on-chip memory, in accordance with some examples of the present disclosure.

Referring to FIG. 14, a block diagram of a particular illustrative implementation of a device is depicted and generally designated 1400. In various implementations, the device 1400 may have more or fewer components than illustrated in FIG. 14. In an illustrative implementation, the device 1400 may correspond to the device 102 of FIG. 1. In an illustrative implementation, the device 1400 may perform one or more operations described with reference to FIGS. 1-13.

In a particular implementation, the device 1400 includes a processor 1406 (e.g., a CPU). The device 1400 may include one or more additional processors 1410 (e.g., one or more DSPs). In a particular implementation, the one or more processors 116 of FIG. 1 correspond to the processor 1406, the processors 1410, or a combination thereof. For example, the processors 1410 may include the decoder 124 and a speech and music coder-decoder (CODEC) 1408. The speech and music CODEC 1408 may include a voice coder ("vocoder") encoder 1436 and a vocoder decoder 1438 or a combination thereof.

The device 1400 may include a memory 1486 and a CODEC 1434. The memory 1486 may include instructions 1456, that are executable by the one or more additional processors 1410 (or the processor 1406) to implement the functionality described with reference to the decoder 124. In a particular example, the memory 1486 corresponds to the memory 110 and the instructions 1456 correspond to the instructions 112 of FIG. 1. The device 1400 may include the modem 118 coupled, via a transceiver 1450, to an antenna 1452.

The device 1400 may include a display 1428, such as the display device 104, coupled to a display controller 1426. The one or more speakers 1436, one or more microphones 1460, or a combination thereof, may be coupled to the CODEC 1434. The CODEC 1434 may include a digital-to-analog converter (DAC) 1402 and an analog-to-digital converter (ADC) 1404. In a particular implementation, the CODEC 1434 may receive analog signals from the microphones 1460, convert the analog signals to digital signals using the analog-to-digital converter 1404, and send the digital signals to the speech and music codec 1408. In a particular implementation, the speech and music codec 1408 may provide digital signals to the CODEC 1434. The CODEC 1434 may convert the digital signals to analog signals using the digital-to-analog converter 1402 and may provide the analog signals to the speakers 1436.

In a particular implementation, the device 1400 may be included in a system-in-package or system-on-chip device 1422. In a particular implementation, the memory 1486, the processor 1406, the processors 1410, the display controller 1426, the CODEC 1434, and the modem 118 are included in a system-in-package or system-on-chip device 1422. In a particular implementation, an input device 1430 (e.g., a keyboard, a touchscreen, or a pointing device) and a power supply 1444 are coupled to the system-in-package or system-on-chip device 1422. Moreover, in a particular implementation, as illustrated in FIG. 14, the display 1428, the input device 1430, the speakers 1436, the microphones 1460, the antenna 1452, and the power supply 1444 are external to the system-in-package or system-on-chip device 1422. In a particular implementation, each of the display 1428, the input device 1430, the speakers 1436, the microphones 1460, the antenna 1452, and the power supply 1444 may be coupled to a component of the system-in-package or system-on-chip device 1422, such as an interface or a controller.

The device 1400 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

In conjunction with the described techniques, an apparatus includes means for identifying, during an intra-block copy (IBC) decoding process on at least a portion of a coding unit of the video data, a target virtual address for data access associated with a particular operation of the IBC decoding process, the target virtual address generated according to an addressing scheme of a virtual memory used by the IBC decoding process. In an example, the means for identifying the target virtual address includes the IBC prediction engine 130, the decoder 124, the one or more processors 116, the device 102, the prediction processing unit 304, one or more other circuits or devices to identify, during an intra-block copy (IBC) decoding process on at least a portion of a coding unit of the video data, a target virtual address for data access associated with a particular operation of the IBC decoding process, or a combination thereof.

The apparatus includes means for dynamically mapping the target virtual address to a particular memory address of a portion of on-chip memory, the on-chip memory having a second size that is smaller than a first size of the virtual memory. In an example, the means for dynamically mapping includes dynamic mapper 160, the IBC prediction engine 130, the decoder 124, the one or more processors 116, the device 102, the prediction processing unit 304, the fetch command generator 402, the IBC data fetcher 404, one or more other circuits or devices to dynamically map the target virtual address to a particular memory address of a portion of on-chip memory, or a combination thereof.

The apparatus also includes means for accessing the on-chip memory using the particular memory address to perform the particular operation of the IBC decoding process. In an example, the accessing the on-chip memory includes the IBC prediction engine 130, the decoder 124, the one or more processors 116, the device 102, the prediction processing unit 304, the reconstruction engine 310, the loop filter 312, the IBC data fetcher 404, the reconstruction engine 410, one or more other circuits or devices to access the on-chip memory using the particular memory address to perform the particular operation of the IBC decoding process, or a combination thereof.

In some implementations, a non-transitory computer-readable medium (e.g., a computer-readable storage device, such as the memory 110) includes instructions (e.g., the instructions 112) that, when executed by one or more processors (e.g., the one or more processors 116), cause the one or more processors to perform operations corresponding to at least a portion of any of the techniques described with reference to FIGS. 1-12, the method of FIG. 13, or any combination thereof.

Particular aspects of the disclosure are described below in the following sets of interrelated clauses:

According to Clause 1, a device includes: a decoder configured to: identify, during an intra-block copy (IBC) decoding process on at least a portion of a coding unit of video data, a target virtual address for data access associated with a particular operation of the IBC decoding process, the target virtual address generated according to an addressing scheme of a virtual memory used by the IBC decoding process; dynamically map the target virtual address to a particular memory address of a portion of an on-chip memory, the on-chip memory configured to store reconstructed blocks of the video data and having a second size that is smaller than a first size of the virtual memory; and access the on-chip memory using the particular memory address to perform the particular operation of the IBC decoding process.

Clause 2. The device of Clause 1, wherein, in response to the particular operation corresponding to a write operation to write a block of pixel data to an unused portion of the virtual memory, the decoder is configured to store a virtual memory start address for the block of pixel data into a data structure that associates virtual memory start addresses with portions of the on-chip memory.

Clause 3. The device of Clause 2, wherein the virtual memory start address for the block of pixel data is based on another stored virtual memory start address associated with another portion of the virtual memory, increased by a block size, and a modulo associated with a row size of the virtual memory.

Clause 4. The device of Clause 1, wherein, in response to the particular operation corresponding to a read operation to read a block of pixel data from the virtual memory, the decoder is configured to locate a virtual memory start address for the block of pixel data in a data structure that associates virtual memory start addresses with portions of the on-chip memory.

Clause 5. The device of any of Clause 1 to Clause 4, wherein the on-chip memory and the decoder are integrated into a single substrate.

Clause 6. The device of any of Clause 1 to Clause 5, wherein the first size is at least two times larger than the second size.

Clause 7. The device of any of Clause 1 to Clause 6, wherein the on-chip memory includes a static random access memory (SRAM) IBC circular buffer.

Clause 8. The device of any of Clause 1 to Clause 7, wherein the addressing scheme corresponding to a Versatile Video Coding (VVC) addressing scheme for IBC decoding.

Clause 9. The device of any of Clause 1 to Clause 8, wherein the decoder is further configured to access the on-chip memory during performance of a loop filtering operation associated with the IBC decoding process.

Clause 10. The device of any of Clause 1 to Clause 9, further including a modem coupled to the decoder, the modem configured to receive the video data from a second device.

Clause 11. The device of any of Clause 1 to Clause 10, wherein the decoder and the on-chip memory are integrated in at least one of a mobile phone, a tablet computer device, a wearable electronic device, a camera device, a virtual reality headset, a mixed reality headset, or an augmented reality headset.

Clause 12. The device of any of Clause 1 to Clause 10, wherein the decoder and the on-chip memory are integrated in a vehicle, the vehicle further including a display device configured to display video data output by the decoder.

According to Clause 13, a method of decoding video data includes: identifying, at one or more processors during an intra-block copy (IBC) decoding process on at least a portion of a coding unit of the video data, a target virtual address for data access associated with a particular operation of the IBC decoding process, the target virtual address generated according to an addressing scheme of a virtual memory used by the IBC decoding process; dynamically mapping, at the one or more processors, the target virtual address to a particular memory address of a portion of on-chip memory, the on-chip memory having a second size that is smaller than a first size of the virtual memory; and accessing the on-chip memory using the particular memory address to perform the particular operation of the IBC decoding process.

Clause 14. The method of Clause 13, wherein a previously used virtual address in the virtual memory is mapped to the particular memory address prior to dynamically mapping the target virtual address to the particular memory address.

Clause 15. The method of Clause 13 or Clause 14, wherein: the particular operation corresponds to a write operation to write a block of pixel data to an unused portion of the virtual memory, dynamically mapping the target virtual address to the particular memory address includes storing a virtual memory start address for the block of pixel data in a data structure that associates virtual memory start addresses with portions of the on-chip memory, and the virtual memory start address for the block of pixel data is based on another stored virtual memory start address associated with another portion of the on-chip memory, increased by a block size, and a modulo associated with a row size of the virtual memory.

Clause 16. The method of Clause 13 or Clause 14, wherein: the particular operation corresponds to a read operation to read a block of pixel data from the virtual memory, and dynamically mapping the target virtual address to the particular memory address includes locating a virtual memory start address for the block of pixel data in a data structure that associates virtual memory start addresses with portions of the on-chip memory.

Clause 17. The method of any of Clause 13 to Clause 16, wherein the on-chip memory includes a static random access memory (SRAM) IBC circular buffer.

Clause 18. The method of any of Clause 13 to Clause 17, wherein the addressing scheme corresponds to a Versatile Video Coding (VVC) addressing scheme for IBC decoding.

According to Clause 19, a device includes: a memory configured to store instructions; and a processor configured to execute the instructions to perform the method of any of Clause 13 to Clause 18.

According to Clause 20, a non-transitory computer-readable medium includes instructions that, when executed by a processor, cause the processor to perform the method of any of Clause 13 to Clause 18.

According to Clause 21, an apparatus includes means for carrying out the method of any of Clause 13 to Clause 18.

According to Clause 22, a non-transitory computer-readable medium includes instructions that, when executed by one or more processors, cause the one or more processors to: identify, during an intra-block copy (IBC) decoding process on at least a portion of a coding unit of video data, a target virtual address for data access associated with a particular operation of the IBC decoding process, the target virtual address generated according to an addressing scheme of a virtual memory used by the IBC decoding process; dynamically map the target virtual address to a particular memory address of a portion of on-chip memory, the on-chip memory having a second size that is smaller than a first size of the virtual memory; and access the on-chip memory using the particular memory address to perform the particular operation of the IBC decoding process.

Clause 23. The non-transitory computer-readable medium of Clause 22, wherein the instructions, when executed by the one or more processors, further cause the one or more processors to update a data structure that associates virtual memory start addresses with portions of the on-chip memory in response to the particular operation corresponding to a write operation.

In one or more examples, the functions described may be implemented in hardware, software, firmware, or any combination thereof. If implemented in software, the functions may be stored as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Those of skill would further appreciate that the various illustrative logical blocks, configurations, circuits, and algorithm steps described in connection with the implementations disclosed herein may be implemented as electronic hardware, computer software executed by a processing device such as a hardware processor, or combinations of both. Various illustrative components, blocks, configurations, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:
   a decoder configured to:
      identify, during an intra-block copy (IBC) decoding process on at least a portion of a coding unit of video data, a target virtual address in a virtual address space for data access associated with a particular operation of the IBC decoding process, the target virtual address generated according to an addressing scheme of an on-chip memory used by the IBC decoding process;
      dynamically map the target virtual address to a particular memory address of a portion of the on-chip memory, the on-chip memory configured to store reconstructed blocks of the video data and having a second size that is smaller than a first size of the virtual address space; and
      access the on-chip memory using the particular memory address to perform the particular operation of the IBC decoding process,
   wherein, in response to the particular operation corresponding to a read operation to read a block of pixel data from the on-chip memory, the decoder is configured to locate the on-chip memory start address for the block of pixel data in a data structure that associates virtual start addresses with portions of the on-chip memory.

2. The device of claim 1, wherein, in response to the particular operation corresponding to a write operation to write a block of pixel data to an unused portion of the on-chip memory, the decoder is configured to store a virtual start address for the block of pixel data into the data structure.

3. The device of claim 2, wherein the virtual start address for the block of pixel data is based on another stored virtual start address associated with another portion of the on-chip memory, increased by a block size, and a modulo associated with a row size of the virtual address space.

4. The device of claim 1, wherein the on-chip memory is configured as a circular buffer to store pixel data of a current block of the video data and reconstructed blocks of the video data that are within a permitted motion vector range for IBC coding, and wherein the circular buffer overwrites pixel data of reconstructed blocks that are no longer within the permitted motion vector range of the current block.

5. The device of claim 1, wherein the on-chip memory and the decoder are integrated into a single substrate.

6. The device of claim 1, wherein the first size is at least two times larger than the second size.

7. The device of claim 1, wherein the on-chip memory comprises a static random access memory (SRAM) IBC circular buffer.

8. The device of claim 1, wherein the addressing scheme corresponds to a Versatile Video Coding (VVC) addressing scheme for IBC decoding.

9. The device of claim 1, wherein the decoder is further configured to access the on-chip memory during performance of a loop filtering operation associated with the IBC decoding process.

10. The device of claim 1, further comprising a modem coupled to the decoder, the modem configured to receive the video data from a second device.

11. The device of claim 1, wherein the decoder and the on-chip memory are integrated in at least one of a mobile phone, a tablet computer device, a wearable electronic device, a camera device, a virtual reality headset, a mixed reality headset, or an augmented reality headset.

12. The device of claim 1, wherein the decoder and the on-chip memory are integrated in a vehicle, the vehicle further including a display device configured to display video data output by the decoder.

13. A device comprising:
   a decoder configured to:
      identify, during an intra-block copy (IBC) decoding process on at least a portion of a coding unit of video data, a target virtual address in a virtual address space for data access associated with a particular operation of the IBC decoding process, the target virtual address generated according to an addressing scheme of an on-chip memory used by the IBC decoding process;
      dynamically map the target virtual address to a particular memory address of a portion of the on-chip memory based on at least one of a current buffer index and a start address array associated with data in the on-chip memory, the on-chip memory configured to store reconstructed blocks of the video data and having a second size that is smaller than a first size of the virtual address space; and
      access the on-chip memory using the particular memory address to perform the particular operation of the IBC decoding process.

14. The device of claim 13, wherein the reconstructed blocks of the video data include a sequence of groups of four blocks of the video data, wherein the on-chip memory is sized to store a single group of four blocks of the video data, and wherein the virtual address space is sized for multiple groups of four blocks of the video data.

15. The device of claim 14, wherein the on-chip memory is configured as a circular buffer to store pixel data of a current block of the video data and three reconstructed blocks of the video data that are within a permitted motion vector range for IBC coding, and wherein the circular buffer overwrites pixel data of reconstructed blocks that are no longer within the permitted motion vector range of the current block.

16. The device of claim 15, wherein the circular buffer includes a top row to store two blocks of the video data and a bottom row to store two blocks of the video data.

17. The device of claim 16, wherein when the target virtual address corresponds to a block of video data in a top row of a two-by-two group of blocks, the decoder is configured to select a storage location in the top row of the circular buffer based on a current top buffer index, and when the target virtual address corresponds to a block of video data in a bottom row of the two-by-two group of blocks, the decoder is configured to select a storage location in the bottom row of the circular buffer based on a current bottom buffer index.

18. The device of claim 17, wherein the decoder is configured to update one of the current top buffer index or the current bottom buffer index in conjunction with storage of a reconstructed block to the circular buffer.

19. The device of claim 15, wherein the decoder is configured to update the start address array to store an indicator of a virtual start address for a reconstructed block in conjunction with storage of the reconstructed block to the circular buffer.

20. A method of decoding video data, the method comprising:
   identifying, at one or more processors during an intra-block copy (IBC) decoding process on at least a portion of a coding unit of video data, a target virtual address in a virtual address space for data access associated with a particular operation of the IBC decoding process, the target virtual address generated according to an addressing scheme of an on-chip_memory used by the IBC decoding process;
   dynamically mapping, at the one or more processors, the target virtual address to a particular memory address of a portion of the on-chip memory based on at least one of a current buffer index and a start address array associated with data in the on-chip memory, the on-chip memory configured to store reconstructed blocks of the video data and having a second size that is smaller than a first size of the virtual address space; and
   accessing the on-chip memory using the particular memory address to perform the particular operation of the IBC decoding process.

* * * * *

UNITED STATES PATENT AND TRADEMARK OFFICE
CERTIFICATE OF CORRECTION

| | | |
|---|---|---|
| PATENT NO. | : 11,849,129 B2 | Page 1 of 1 |
| APPLICATION NO. | : 17/655393 | |
| DATED | : December 19, 2023 | |
| INVENTOR(S) | : John Thodiyil | |

It is certified that error appears in the above-identified patent and that said Letters Patent is hereby corrected as shown below:

In the Specification

Column 11, Line 20, change:
"prediction"

To read:
--predict--

Column 15, Line 44, change:
"steaming"

To read:
--streaming--

Column 17, Lines 65 and 66, change:
"codec 1408"

To read:
--CODEC 1408--

Column 19, Line 4, change:
"the accessing the on-chip memory"

To read:
--the means for accessing the on-chip memory--

Signed and Sealed this
Eighteenth Day of February, 2025

Coke Morgan Stewart
*Acting Director of the United States Patent and Trademark Office*